United States Patent Office 3,516,876
Patented June 23, 1970

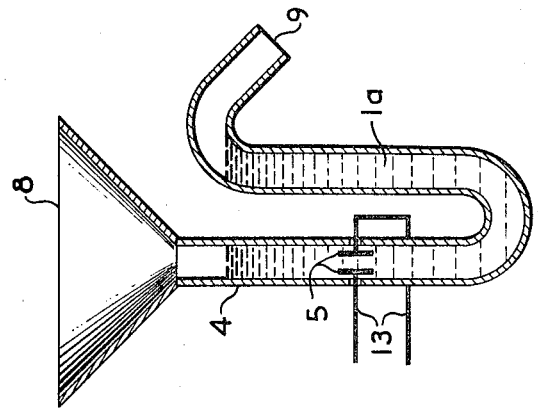
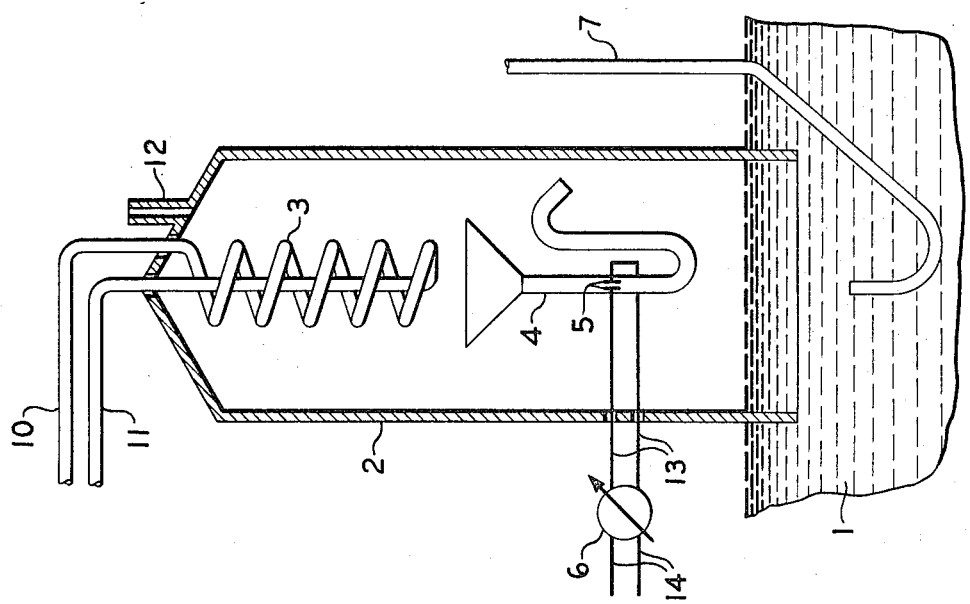
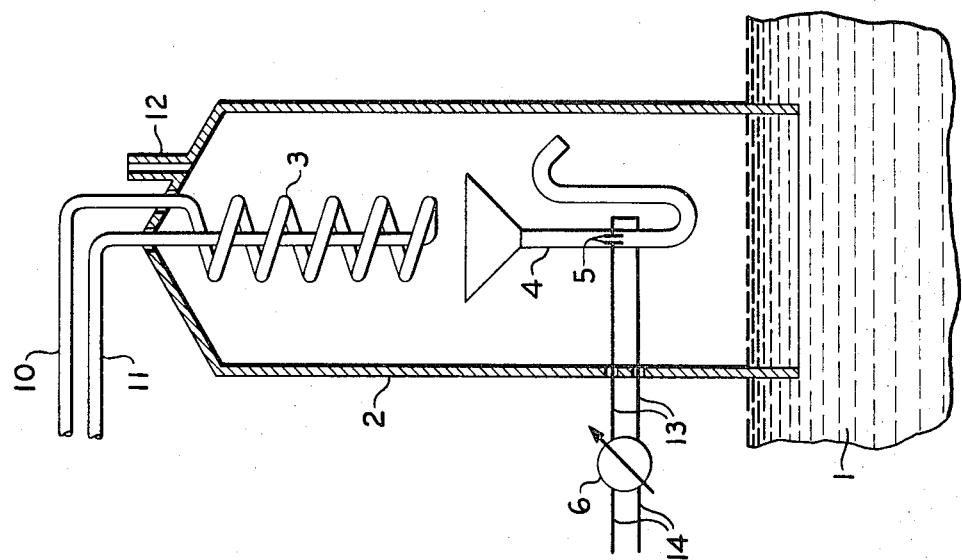

3,516,876
AUTOMATIC CONTROL METHOD
Dieter Hauffe, Kilianstadten, Germany, assignor to Hooker Chemical Corporation, Niagara Falls, N.Y., a corporation of New York
Filed Mar. 20, 1967, Ser. No. 624,576
Claims priority, application Germany, Mar. 25, 1966, 1,598,784
Int. Cl. C23f 7/08, 7/18
U.S. Cl. 148—6.15       6 Claims

ABSTRACT OF THE DISCLOSURE

A method for automatically controlling nitrite in acidic metal treating solutions, such as acidic phosphatizing solutions. The control is effected by vaporizing water and nitroso gases from the phosphatizing bath and condensing this mixture on a cold surface. The electrical conductivity of the condensate is measured and the measured value is transformed into an electrical impulse which operates a metering pump to effect the addition of nitrite to the phosphatizing bath as is required to bring the nitrite content up to the desired level.

---

This invention relates to an automatic measuring and control process and more particularly it relates to a method for automatically measuring and controlling the amount of nitrite in an acidic phosphatizing solution for the treatment of metal surfaces.

In the chemical treatment of metal surfaces, using aqueous acidic solutions, it is well known to include nitrite ions in the treating solution, typically in the form of a soluble nitrite, such as sodium nitrite or potassium nitrite. Exemplary of the metal treating solutions in which nitrite ions are frequently included are phosphatizing solutions, including alkali metal and heavy metal phosphate solutions, as well as oxalate solutions, such as those made up from oxalic acid, and the like. In these solutions, the nitrite ions accelerate the chemical reaction which takes place on the metal surface, as for example, by oxidizing the hydrogen which is generated during the reaction of the treating solution and the metal, which hydrogen may then be reduced, depending upon the treatment conditions, to nitrogen or ammonia.

In order to obtain the best results with the metal treating solution, it is desirable that the concentration of the nitrite ions be maintained as close to the predetermined optimum concentration of these ions as is possible. For many operations, it has been found that this concentration is within the range of about 0.1 to about 1.0 gram per liter, calculated as sodium nitrite. To effect this control, it is, therefore, necessary to analyze frequently the treating solution, to determine the nitrite ion concentration, and, thereafter, to replenish the solution, based on this analysis so as to maintain the nitrite ion concentration within the desired range. In the case of the spray application of the treating solution, for example, it is often necessary that these analyses be carried out every thirty minutes, at least until the average nitrite consumption of the solution has been determined with sufficient accuracy that a continual replenishing of the solution with an aqueous nitrite solution can be carried out with a metering pump. Even after this has been done however, it is still necessary to make periodic analyses of the solution, determining the nitrite content thereof, and then, as soon after the analyses as possible, making whatever adjustments in the metering pump are necessary to continually maintain the nitrite content of the solution within the desired range.

Inasmuch as these analyses are generally not made by automatic titrations, they are, of course, somewhat cumbersome and time consuming. Moreover, because some finite period of time is required to make the analysis and then determine what adjustments in the rate of addition of the nitrite solution are needed, changes in the makeup of the treating solutions may occur after the sample has been taken for analysis, so that adjustments in the metering of the nitrite solution to the treating bath may not be truly representative of the actual bath requirements.

It is, therefore, an object of the present invention to provide an improved method for determining the nitrite composition of an acidic metal treating solutions.

A further object of the present invention is to provide an improved process for automatically determining the nitrite concentration in an acidic metal treating solution and automatically replenishing the nitrite content of the solution based on this determination.

Another object of the invention is to provide a process for chemically coating a metal surface using a nitrite accelerated coating solution, wherein the nitrite concentration of the solution is automatically measured and controlled.

These and other objects will become apparent to those skilled in the art from a description of the invention which follows.

In the drawings, which are attached hereto and form a part hereof, FIG. 1 is a side view, in section of one form of apparatus which may be used in carrying out the process of the invention; FIG. 2 is a side view, in section, of a modified form of the apparatus shown in FIG. 1; and FIG. 3 is a side view, in section, of the liquid collecting portion of the apparatus shown in FIGS. 1 and 2.

Pursuant to the above objects, the present invention includes a process for analyzing and controlling the nitrite concentration in an acidic metal treating solution which comprises vaporizing from an acidic aqueous metal treating solution a mixture of water vapor and nitroso gases, condensing the thus-vaporized mixture, measuring the electrical conductivity of the condensate, transforming the measured value into an electrical impulse directed to a metering device, and supplying a nitrite containing solution to the metal treating solution, in response to said impulse, in amounts sufficient to compensate for changes in the nitrite concentration of the treating solution. In this manner, there is obtained a substantially continuous, automatic analysis of the nitrite content of the metal treating solution and the supplying of nitrite solution to the treating bath is automatically effected in response to this measurement.

More specifically, in the practice of the present invention, it has been found that the nitrite ions in the aqueous acidic metal coating solution form nitrous acid. The nitrous acids thus-formed, are found to decompose, with the generation of nitroso gases, particularly when the coating solution is agitated, such as during spraying or flooding application methods. An equilibrium results between the amount of the nitroso gases which leave the coating bath and the nitrite concentration in the bath solution itself. This equilibrium will, of course, be affected by other factors, including the bath temperature, the acidity of the bath, and the like.

The mixture of gases which are vaporized from the treating solution contains water vapor and nitroso gases. This gas mixture is then condensed, preferably on a cold surface, and the electrical conductivity of the condensate is then measured, as for example with a conductivity cell. It is apparent, that the electrical conductivity of this condensate will depend upon the amount of nitroso gases which it contains and that this is, of course, functionally related to the nitrite content of the solution bath itself. Accordingly, the measured conductivity of this condensate is, therefore, a measure of the nitrite content of the coating solution. The conductivity measurement obtained is then transformed into electrical impulse which operates a regulator on a metering pump, opening or closing the pump to provide nitrite containing solution to the coating bath, as is required to maintain the nitrite concentration thereof at a predetermined level.

Any suitable device may be utilized in measuring the conductivity of the condensate, as for example, various conductivity cells, as are known in the art. The conductivity measurement obtained by these devices is then converted to a suitable electrical impulse which actuates the control mechanism of a suitable metering pump, which pump supplies a nitrite containing solution to the coating bath. Here again, various different control systems, as are known in the art, may be used. For example, this control apparatus may be of the line-voltage energized AC Wheatstone bridge type, which contains a measurement circuit and a vacuum-tube relay ciruit which is operated directly by unbalance of the bridge circuit. In such equipment, the desired nitrite concentration of the coating solution bath is determined and translated into terms of the conductivity of the bath. This value is then set on the control equipment so that as the conductivity of the bath condensate is measured, variations in this conductivity from the value set on the control apparatus actuates the apparatus, by means of an electrical impulse, which in turn actuates a suitable metering pump. It is believed that the precise design of this automatic control equipment is well known to those in the art so that suitable equipment may be selected, depending upon the requirements of the particular operation.

In carrying out the process of the present method, the vaporization of the mixture of water vapor and nitroso gases from the acidic coating solution may be carried out on the main body of the treating solution itself. Preferably, however, a sample stream is taken from the main body of coating solution and the gas mixture is then vaporized from this sample portion. It has been found that the vaporization of the gas mixture may be accelerated by increasing the solution temperature and/or by introducing into the solution an inert gas, such as air, which may be bubbled through the solution. In this manner, the time lag between a change in the nitrite content of the treating bath and the compensation for this change can be reduced. Additional reductions in this time lag may be effected by reducing the volume of the sample solution in the measuring cell.

As has been noted hereinabove, the content of the nitroso gases in the condensate which is obtained for measurement, according to the present method, will depend upon other factors, in addition to the nitrite content of the solution bath. Thus, the bath temperature as well as its pH value will also have an effect on the nitro gas content of the condensate, for example, a decrease in the pH and/or an increase in the bath temperature will result in a decrease in the concentration of the nitroso gases. Accordingly, in order that the measurements obtained by the present method will be a true reflection of the nitrite content of the coating bath, it is desirable that these factors, such as the bath temperature and acidity be maintained substantially constant.

In order to better understand the operation of the present process, reference is now made to the drawings wherein there are shown typical apparatus for carrying this process into effect. As shown in FIG. 1, this apparatus includes an enclosed vaporization chamber housing 2 provided with a vent 12 to the atmosphere. Within this housing is disposed a cooling coil 3 having an inlet 10 and an outlet 11 for a suitable cooling fluid. A measuring cell 4 is also disposed in the housing 2 which cell contains the electrodes 5, connected by suitable electrical leads 13 to the conductivity measuring device 6, which is disposed outside of the houseing 2. The conductivity measuring device 6 is provided with electrical leads 14 which are connected to suitable control apparatus (not shown) which converts the measured conductivity into an electrical impulse for operating a suitable metering pump. In operation, vaporization of the solution sample 1, from the acidic aqueous metal treating bath, is effected so that a mixture of water vapor and nitroso gases is formed within the housing 2. A suitable cooling fluid is passed through the cooling coil 3 within the housing 2 so that the vaporized mixture of water vapor and nitroso gases condenses on this coil and is collected in the measuring cell 4. As is shown more clearly in FIG. 3, the condensed mixture of water vapor and nitroso gases is collected by the funnel shaped portion 8 of the measuring cell 4 and added to the condensate 1a in the cell. The solution 1a which is already present in the cell is replaced by the incoming condensate and flows out through the exit portion of the cell 9. The conductivity of the fresh condensate in the cell is measured between the electrodes 5. Desirably, the temperature in the vaporization chamber housing 2 is maintained slightly above room temperature, i.e. 20 degrees centigrade, although higher temperatures may be utilized in order to obtain a more rapid volitalization of water vapor-nitroso gas mixture. Inasmuch as the conductivity measurement which is made in the cell 4 will be effected by the temperature of the solution, the influence of the temperature may be compensated for by using suitable resistance elements in the measuring device 6.

Alternatively, as is shown in FIG. 2, the present apparatus may be provided with a suitable conduit 7 which is positioned in the solution sample, below the housing 2 of the vaporization chamber. In this manner, a suitable inert gas, such as air may be passed through the conduit 7 to aid in the vaporization of the solution and form the gas mixture of water vapor and nitroso gases within the chamber housing 2. Particularly where using the configuration FIG. 2, it has been found to be desirable to provide means in the collecting cell to prevent droplets of the coating bath solution from being introduced into the cell 4. This may be achieved by means of the funnel shaped collecting member 8 shown on cell 4 or by providing a suitable baffie member beneath the cell for this purpose.

It is to be appreciated, that the measuring and controlling method of the present invention may be carried out on various acidic metal treating solutions which contain nitrite ions, including phosphatizng solutions, oxalate solutons and the like. Typically these solutions are aqueous acidic solutions containing phosphate ions, metal ions such as zinc, or alkali metal ions, or are solutions of oxalic acid. Additionally, such solutions may also contain accelerating ions than the nitrite ions such as nitrate ions, nickel ions, and the like, as are known to those in the art. It is to be further appreciated, that although the invention has been described with reference to condensing the water vapor-nitroso gas mixture on a cold surface, any suitable condensation technique may be used, such as condensation of the gas mixture under pressure or in a super cooled atmosphere. In general, however, condensation methods wherein the condensation takes place on a cold surface are simplier and hence, are preferred.

In order that those skilled in the art may better understand the present invention and the manner in which it is practiced, the following example is given. In this example temperatures are given in degrees centigrade and parts and percents are by weight. It is to be appreciated, however, that this example is merely exemplary of the present invention and is not to be taken as a limitation thereof.

EXAMPLE

An aqueous metal treating solution was prepared containing the following components in the amounts indicated:

Zn—2.9 grams/liter
$P_2O_5$—2.5 grams/liter
$NO_3$—3.3 grams/liter
Na—0.4 gram/liter
Ni—10 milligrams/liter
$NaNO_2$—150 milligrams/liter Clean steel plates were sprayed for 2 minutes with this solution at a temperature of 50 degrees centigrade. The treating solution was maintained at a concentration of 12 points by the addition thereto of a concentrate containing 10.8% by weight Zn, 19.75% by weight $P_2O_5$, 8.20% by weight $NO_3$ and 0.036% by weight Ni. The points are the number of milliliters of a 0.1 normal sodium hydroxide solution required to titrate a 10 milliliter sample of the bath solution to the phenolphthalene end point. A sample stream of the coated solution was directed to apparatus as shown in FIG. 2 of the drawing wherein the mixture of water vapor and nitroso gases was volatilized from the solution, condensed on the cooling coils and collected in the measuring cell, the vaporization of the gas mixture being accelerated by the introduction of air through the pipe 7. On a fresh solution, having the desired sodium nitrite concentration of 150 milligrams per liter, the conductivity was measured as 7000 micro mhos. This value was set on the automatic control equipment which, upon deviations from this value, operated a metering pump which added to the treating solution a solution containing 10% by weight of sodium nitrite. Using this procedure, during the time of operation with this treating solution, the nitrite concentration in the bath was maintained within ±3% of the predetermined value, which corresponded to a nitrite fluxation within the range of 145 to 155 milligrams per liter, calculated as sodium nitrite.

While there have been described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for analyzing and controlling nitrite concentrations in an acidic phosphatizing or oxalate metal treating solution which comprises vaporizing from said treating solution a mixture of water vapor and nitroso gases, condensing the thus-vaporized mixture, measuring the electrical conductivity of the condensate, transforming the measured conductivity into an electrical impulse directed to a metering device, and supplying a nitrite containing solution to the metal treating solution, in response to said impulse, in amounts sufficient to compensate for changes in the nitrite concentration of the treating solution.

2. The method as claimed in claim 1 wherein the vaporization of the water vapor-nitroso gas mixture is accelerated by passing an inert gas through the solution and the vaporized mixture is condensed on a cold surface.

3. The method as claimed in claim 1 wherein the vaporization of the water vapor-nitroso gas mixture from the treating solution is accelerated by increasing the solution temperature and the vaporized mixture is condensed on a cold surface.

4. A method for treating metal surfaces to provide a coating thereon which comprises contacting the surface to be treated with an aqueous acidic phosphatizing solution containing nitrite ions as an accelerator, maintaining the metal surface in contact with the solution for a period sufficient to effect the formation of the desired coating and analyzing and controlling the nitrate concentration of the treating solution by the method as claimed in claim 1.

5. The method as claimed in claim 4 wherein the vaporization of the water vapor-nitroso gas mixture is accelerated by passing an inert gas through the treating solution and the vaporized mixture is condensed on a cold surface.

6. The method as claimed in claim 4 wherein the vaporization of the water vapor-nitroso gas mixture is accelerated by increasing the temperature of the treating solution and the vaporized mixture is condensed on a cold surface.

References Cited

UNITED STATES PATENTS

| | | | |
|---|---|---|---|
| 2,739,663 | 3/1956 | Gurney | 324—30 X |
| 2,832,673 | 4/1958 | Larson et al. | |
| 3,158,444 | 11/1964 | Larson et al. | |
| 3,401,065 | 9/1968 | Steinbrecher et al. | 148—6.15 |

RALPH S. KENDALL, Primary Examiner

U.S. Cl. X.R.

23—2.30; 117—6.14; 324—30